(12) United States Patent
Berglas et al.

(10) Patent No.: US 8,407,454 B2
(45) Date of Patent: *Mar. 26, 2013

(54) PROCESSING LONG-LATENCY INSTRUCTIONS IN A PIPELINED PROCESSOR

(75) Inventors: Morrie Berglas, London (GB); Yoong Chert Foo, London (GB)

(73) Assignee: Imagination Technologies, Ltd., Kings Langley, Hertfordshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,218

(22) Filed: Jun. 3, 2012

(65) Prior Publication Data

US 2012/0246451 A1    Sep. 27, 2012

Related U.S. Application Data

(63) Continuation of application No. 11/805,364, filed on May 23, 2007, now Pat. No. 8,214,624.

(30) Foreign Application Priority Data

Mar. 26, 2007    (GB) .................................. 0705804.3

(51) Int. Cl.
*G06F 9/30* (2006.01)
*G06F 9/40* (2006.01)
*G06F 9/00* (2006.01)
*G06F 9/44* (2006.01)
*G06F 7/38* (2006.01)

(52) U.S. Cl. ........................................ 712/216; 712/244
(58) Field of Classification Search ........................ None
See application file for complete search history.

(56) References Cited

U.S. PATENT DOCUMENTS

| | | | | |
|---|---|---|---|---|
| 5,961,630 A * | 10/1999 | Zaidi et al. | ..................... | 712/200 |
| 5,996,064 A * | 11/1999 | Zaidi et al. | ..................... | 712/216 |
| 6,035,389 A * | 3/2000 | Grochowski et al. | ......... | 712/216 |
| 2004/0225868 A1* | 11/2004 | Kim et al. | ..................... | 712/214 |
| 2005/0022196 A1* | 1/2005 | Davis et al. | ................... | 718/100 |

* cited by examiner

*Primary Examiner* — Eddie P Chan
*Assistant Examiner* — William B Partridge
(74) *Attorney, Agent, or Firm* — Michael S. Garrabrants; ArtesynIP, Inc.

(57) ABSTRACT

There is provided a method and processor for processing a thread. The thread comprises a plurality of sequential instructions, the plurality of sequential instructions comprising some short-latency instructions and some long-latency instructions and at least one hazard instruction, the hazard instruction requiring one or more preceding instructions to be processed before the hazard instruction is processed. The method comprises the steps of: a) before processing each long-latency instruction, incrementing by one, a counter associated with the thread; b) after each long-latency instruction has been processed, decrementing by one, the counter associated with the thread; c) before processing each hazard instruction, checking the value of the counter associated with the thread, and i) if the counter value is zero, processing the hazard instruction, or ii) if the counter value is non-zero, pausing processing of the hazard instruction until a later time. The processor includes means for performing steps a), b) and c) of the method.

19 Claims, 4 Drawing Sheets

PROCESSING LONG-LATENCY INSTRUCTIONS IN A PIPELINED PROCESSOR

FIELD OF THE INVENTION

The invention relates to a method for processing a thread in a pipelined processor and such a pipelined processor. Particularly, but not exclusively, the invention relates to a method for processing a plurality of threads in a multi-threaded pipeline processor and such a multi-threaded pipeline processor.

BACKGROUND OF THE INVENTION

In computer architecture, a data hazard is a problem that can occur in a pipelined processor. Instructions in a pipelined processor are performed in several stages, so that, at any given time, several instructions are being executed and the instructions may not be completed in the desired order. A data hazard occurs when two or more of these simultaneous, and possibly out-of-order, instructions conflict and cause an error.

Data hazards occur when data is modified. A data hazard can occur in the following situations: 1) Read after Write (RAW): An operand is modified and read soon after. Because the first instruction may not have finished writing to the operand, the second instruction may use incorrect data; 2) Write after Read (WAR): Read an operand and write soon after to that same operand. Because the write may have finished before the read, the read instruction may incorrectly get the new written value; and 3) Write after Write (WAW): Two instructions that write to the same operand are performed. The first one may finish second and therefore leave the operand with an incorrect data value. The operands involved in data hazards can reside in memory or in a register.

A pipelined processor's instruction set may contain special instructions which have exceptionally high latencies relative to standard instructions. A primary example would be an instruction which fetches data from memory. The problem of data hazards is relatively easy to avoid for low latency instructions i.e. instructions that can be completed in a small number of clock ticks, because it is then relatively easy to ensure that the instructions within a particular thread are completed in the issued order. However, when high latency instructions are included in a thread, the problem of data hazards is more significant because there is more likelihood that the instructions in a particular thread will not complete in the issued order.

These problems arise in all sorts of circumstances e.g. in 3D graphics processors, in Central Processing Units (CPUs) including dedicated media CPUs in which real time inputs are being received, and in communication with multi-processor systems.

To deal with the high latency instructions, the processor should ideally provide a mechanism to swap out a thread which is waiting for instructions to complete. However, certain requirements also have to be fulfilled.

Firstly, in a multi-threaded processor, many threads might have potential data hazards i.e. instructions which depend upon preceding instructions being completed, before they are processed.

Secondly, each thread might have a large number of long latency instructions, which could all be adjacent in the stream. It must be possible to allow the return data from long latency instructions to come back in a different order from which they were dispatched. Given that there could be a number of long latency instructions being processed at one time, we must reduce as much as possible processor stalling due to data hazards from long latency instructions.

Thirdly, it has to be possible to skip over any instructions in the thread where there is a branch in the thread, especially those which might cause a data hazard, because they depend upon preceding instructions being completed before they are processed.

Fourth, it must be possible to read results in a different order than they were written. Fifth, there shall be no penalty for multiple read accesses of destinations. Sixth, it also must be permitted for the same destination to be written to and re-used as a destination for another long latency instruction.

Finally, it is preferable that no dedicated or mass storage is needed in processing the long latency instructions and potential data hazard instructions. It is also preferable that gate costs are kept to a minimum.

It is an object of the invention to provide a method and apparatus for processing threads which mitigates or overcomes the problem of data hazards in long latency operations.

SUMMARY OF THE INVENTION

According to a first aspect of the invention, there is provided a method for processing a thread in a pipelined processor, the thread comprising a plurality of sequential instructions, the plurality of sequential instructions comprising some short-latency instructions and some long-latency instructions and at least one hazard instruction, the hazard instruction requiring one or more preceding instructions to be processed before the hazard instruction is processed, the method comprising the steps of: a) before processing each long-latency instruction, incrementing by one, a counter associated with the thread; b) after each long-latency instruction has been processed, decrementing by one, the counter associated with the thread; c) before processing each hazard instruction, checking the value of the counter associated with the thread, and i) if the counter value is zero, processing the hazard instruction, or ii) if the counter value is non-zero, pausing processing of the hazard instruction until a later time.

Thus, if the counter is non-zero, which means that one or more long latency instructions are being processed and are still outstanding, the hazard instruction is put on hold. This means that there is no possibility that the hazard instruction could be processed before any preceding threads, thereby causing a data hazard. Short-latency instructions are those instructions which can be completed within a certain, predetermined number of clock ticks. Long-latency instructions are those instructions which require more than the predetermined number of clock ticks to be completed.

Preferably, the method is for processing a plurality of threads, each thread having a respective counter associated therewith. The plurality of threads are the threads which may be resident at any one time. In a preferred embodiment, the number of resident threads is 16.

Preferably, the or each thread in the processor is, at any one time, either being processed, or waiting to be processed, or paused in accordance with step c)ii).

Preferably, at any one time, a subset of the plurality of threads is being processed. In one preferred embodiment, the number of threads in the subset is 4.

Preferably, the method further comprises processing the subset of threads by executing one instruction from each thread in the subset in a round robin manner.

Advantageously, the number of threads in the subset is equal to the maximum number of clock ticks required to process a short-latency instruction. In this way, for short latency instructions, there is no possibility of data hazards.

In one embodiment, the method further comprises: after processing the final instruction of a thread, removing the thread from the subset of the plurality of threads. Thus, once a thread has been completely processed, there is a space available in the subset.

Preferably, the method further comprises the step of: periodically checking the value of the counter associated with any threads having instructions that have been paused in accordance with step c)ii), and, if the value of the counter of a thread is zero, transitioning that thread to the waiting to be processed state. Thus, once the counter of the thread has reduced to zero, we know that there are no long latency instructions still outstanding. Thus, the pausing of the thread (in accordance with step c) ii)) can now be removed. In one embodiment, the step of checking is carried out on every clock tick.

Preferably, the processor is arranged to process any number of threads up to the plurality of threads, such that, at any one time, zero, one or more of the plurality of thread locations are empty.

Preferably, the or each thread has a plurality N of respective counters associated therewith and step c) of the method comprises: before processing each hazard instruction, checking the value of at least one of the N counters associated with the thread; and i) if all of the values of the at least one counters are zero, processing the hazard instruction, or ii) if one or more of the values of the at least one counters are non-zero, pausing processing of the hazard instruction until a later time.

Then, preferably, each long-latency instruction includes an indication of which of the at least N counters should be incremented before the long-latency instruction is processed and decremented after the long-latency instruction is processed.

Also preferably, either each hazard instruction is preceded by an instruction that includes an indication of which of the N counters should be checked before the hazard instruction is processed, or each hazard instruction itself includes an indication of which of the N counters should be checked before the hazard instruction is processed.

With this arrangement, use of the N hazard counters can be optimised. For example, a particular hazard instruction might depend on a first long latency instruction being processed, but not on a second long latency instruction. In that case, the first long latency instruction may include an indication that the nth counter should be incremented before it is processed, and the second long latency instruction may include an indication that the mth counter should be incremented before it is processed. Then, the hazard instruction may include an indication that only the nth counter of the N counters should be checked before it is processed.

There is also provided a computer program which, when run on computer means, causes the computer means to carry out the method of the first aspect of the invention. There is also provided a record carrier having stored thereon such a computer program.

According to a second aspect of the invention, there is provided a pipelined processor for processing a thread, the thread comprising a plurality of sequential instructions, the plurality of sequential instructions comprising some short-latency instructions and some long-latency instructions and at least one hazard instruction, the hazard instruction requiring one or more preceding instructions to be processed before the hazard instruction is processed, the processor comprising: a counter associated with the thread; means to increment the counter by one, before each long-latency instruction is processed; means to decrement the counter by one, after each long-latency instruction has been processed; and means for checking the value of the counter associated with the thread, before each hazard instruction is processed, and i) if the counter value is zero, processing the hazard instruction, or ii) if the counter value is non-zero, pausing processing of the hazard instruction until a later time.

In one preferred embodiment, the means to increment the counter and to decrement the counter comprises an instruction decoder, the instruction decoder being able to distinguish between short-latency instructions and long-latency instructions.

In one preferred embodiment, the processor further comprises a thread manager and the counter is maintained by the instruction decoder but can be accessed by the thread manager.

Preferably, the means for checking the value of the counter associated with the thread before a hazard instruction is processed comprises the instruction decoder, the instruction decoder being able to distinguish between the hazard instructions and the remaining instructions.

Preferably, the processor is suitable for processing a plurality of threads, each thread having a respective counter associated therewith. In one preferred embodiment, there are 16 threads in the plurality of threads.

Preferably, the or each thread in the processor is, at any one time, either being processed, or waiting to be processed, or paused in accordance with ii). Preferably, the thread manager keeps track of the state of each resident thread in the processor.

Preferably, at any one time, a subset of the plurality of threads is being processed. In one preferred arrangement the number of threads in the subset is 4.

In one embodiment, the processor further comprises means for processing the subset of threads by executing one instruction from each thread in the subset in a round robin manner.

Advantageously, the number of threads in the subset is equal to the maximum number of clock ticks required to process a short-latency instruction. Thus, there will be no data hazard problems for short latency instructions.

Preferably, the processor is arranged, after processing the final instruction of a thread, to remove the thread from the subset of the plurality of threads. This transitioning between states is preferably performed by the thread manager.

Preferably, the processor is arranged to periodically check the value of the counter associated with any threads having instructions that have been paused in accordance with ii), and, if the value of the counter of a thread is zero, to transition that thread to the waiting to be processed state. Again, preferably, the checking and transitioning are performed by the thread manager. The checking may be carried out once every clock tick.

Preferably, the processor is arranged to process any number of threads up to the plurality of threads, such that, at any one time, zero, one or more of the plurality of thread locations are empty.

In one embodiment, the or each thread has a plurality N of respective counters associated therewith and the means for checking the value of the counter associated with the thread comprises: means for checking the value of at least one of the N counters associated with the thread, before each hazard instruction is processed; and i) if all of the values of the at least one counters are zero, processing the hazard instruction, or ii) if one or more of the values of the at least one counters are non-zero, pausing processing of the hazard instruction until a later time.

In that case, each long-latency instruction may include an indication of which of the at least N counters should be incremented before the long-latency instruction is processed and decremented after the long-latency instruction is processed.

Also, each hazard instruction may be preceded by an instruction that includes an indication of which of the N counters should be checked before the hazard instruction is processed. Alternatively, each hazard instruction may include an indication of which of the N counters should be checked before the hazard instruction is processed.

Features described in relation to one aspect of the invention may also be applicable to the other aspect of the invention.

BRIEF DESCRIPTION OF THE DRAWINGS

Exemplary embodiments of the invention will now be described with reference to the accompanying drawings, of which

DETAILED DESCRIPTION OF A PREFERRED EMBODIMENT

Figure 1:
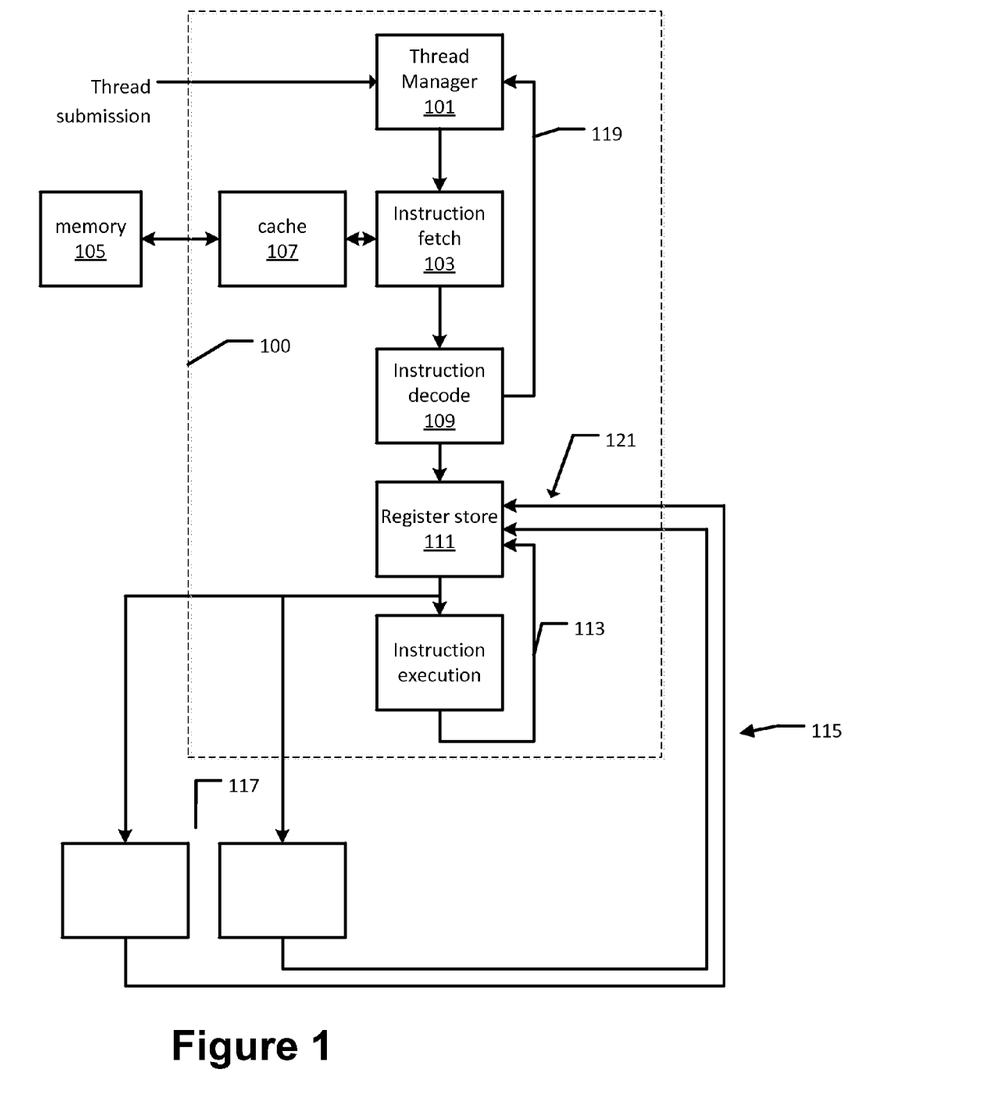
FIG. 1 is a diagram of a multi-threaded processor according to an embodiment of the invention.

FIG. 1 shows a multi-threaded processor according to one embodiment of the invention. The processor 100 comprises a thread manager 101 which receives submissions of threads to be processed. The thread manager 101 is connected to an instruction fetcher 103, which can fetch the appropriate instruction, as indicated by the thread manager 101, from an external memory 105 or internal cache 107. The fetched instruction then goes to an instruction decoder 109. The register store 111 forwards the instructions for execution and the result is returned and input into the register store. The register store also fetches the source arguments to be sent down to instruction execution.

In this embodiment, the multi-threaded processor can deal with two categories of instructions. The first category comprises low latency (or short latency) instructions where the instruction result is written back to the register store in a deterministic and few number of clock ticks. These instructions execute within the processor 100. Examples of such instructions are simple addition and multiplication. These low-latency instructions are relatively easy to handle and are shown at loop 113 in FIG. 1.

The second category comprises high-latency (or long latency) instructions where the instruction result is written back to the register store from an external unit with a variable and unpredictable latency, which could be as large as dozens of clock ticks. These are shown in FIG. 1 at loop 115. These high latency instructions send processing requests to external units 117 such as memory interfaces, texture sampling units and math co-processors. Note that, in FIG. 1, the units are shown to be outside the processor module 100, but this is not necessarily the case. They are tightly coupled with the processor 100 and are likely on the same die.

Operation of the processor 100 of FIG. 1 will now be described, firstly for the low-latency instructions, secondly for the high-latency instructions. Operation is performed so as to avoid data hazards. In the processor, once an instruction has begun execution i.e. it has left thread manager 101 and has been sent to the instruction fetcher, it cannot stop. Any hazards cause the processor pipeline to stall until the data hazard clears.

Figure 2:
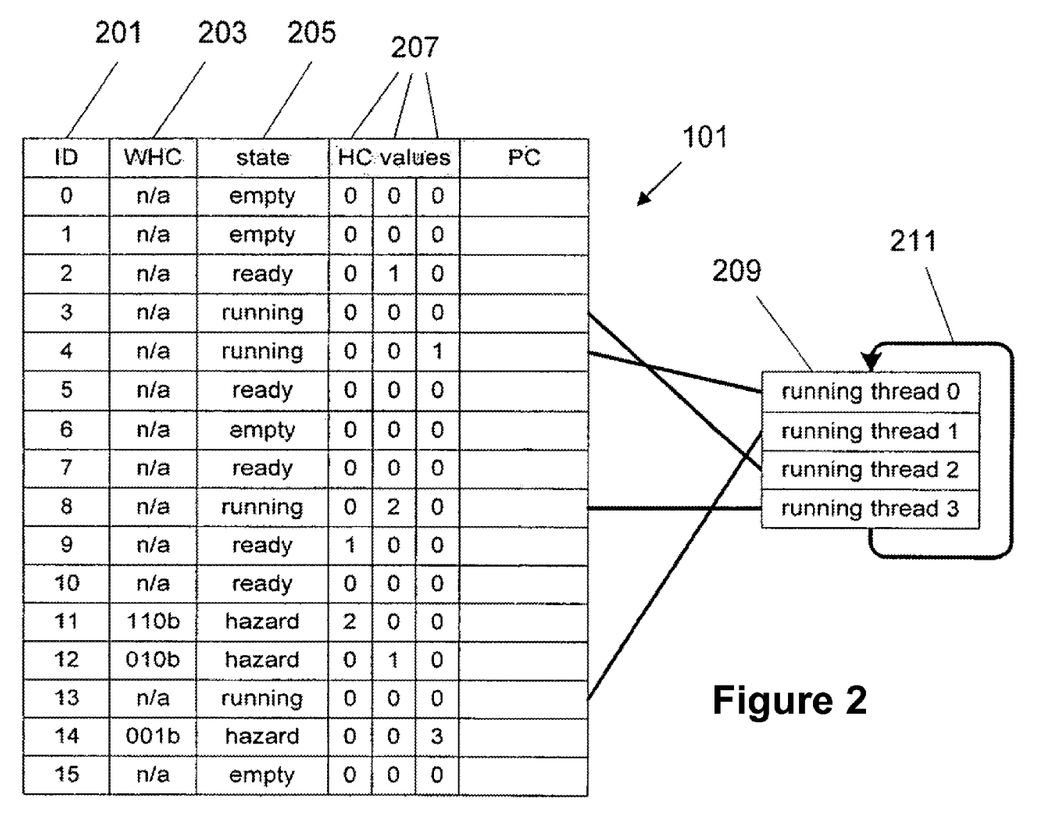
FIG. 2 is a schematic diagram of the thread manager 101 of FIG. 1.

FIG. 2 is a schematic diagram of the thread manager 101. The multi-threaded processor 100 is configured to have a certain number of resident threads that can simultaneously exist on the processor. In the example shown in FIG. 2, this number is 16. Each of the 16 resident threads has an ID 201. At any given time, each thread is in a particular state 205. The four possible states are "empty", "ready", "running" and "hazard" and the four states will be described further below. The values in columns 203 and 207 will also be described below.

From those 16 resident threads, a subset 209 of threads is in the "running" state at any one time. The thread manager 101 executes one instruction from each running thread in a round robin manner on a clock tick by clock tick basis (see 211). The number of threads in the subset that can be in the "running" state at any one time is equal to the largest number of clock ticks it takes to process the low latency instructions. Because of this, it is guaranteed that the processing of a particular instruction is completed in a single cycle such that a later instruction in the same thread cannot be processed until the earlier instruction has been processed. In the example in FIG. 2, the number in the "running" subset 209 is equal to 4. Thus, as long as there are four resident threads running there will be no data hazard penalties on low latency instructions.

Referring once again to FIG. 2, the thread manager 101 keeps track of each resident thread's state. As already discussed, the "running" state means that the thread is currently being executed. The "empty" state means that there is no resident thread present for this ID 201. The "ready" state means that the thread is ready to be executed as soon as there is space in the "running" subset 209. The "hazard" state will be described below.

Figure 3:
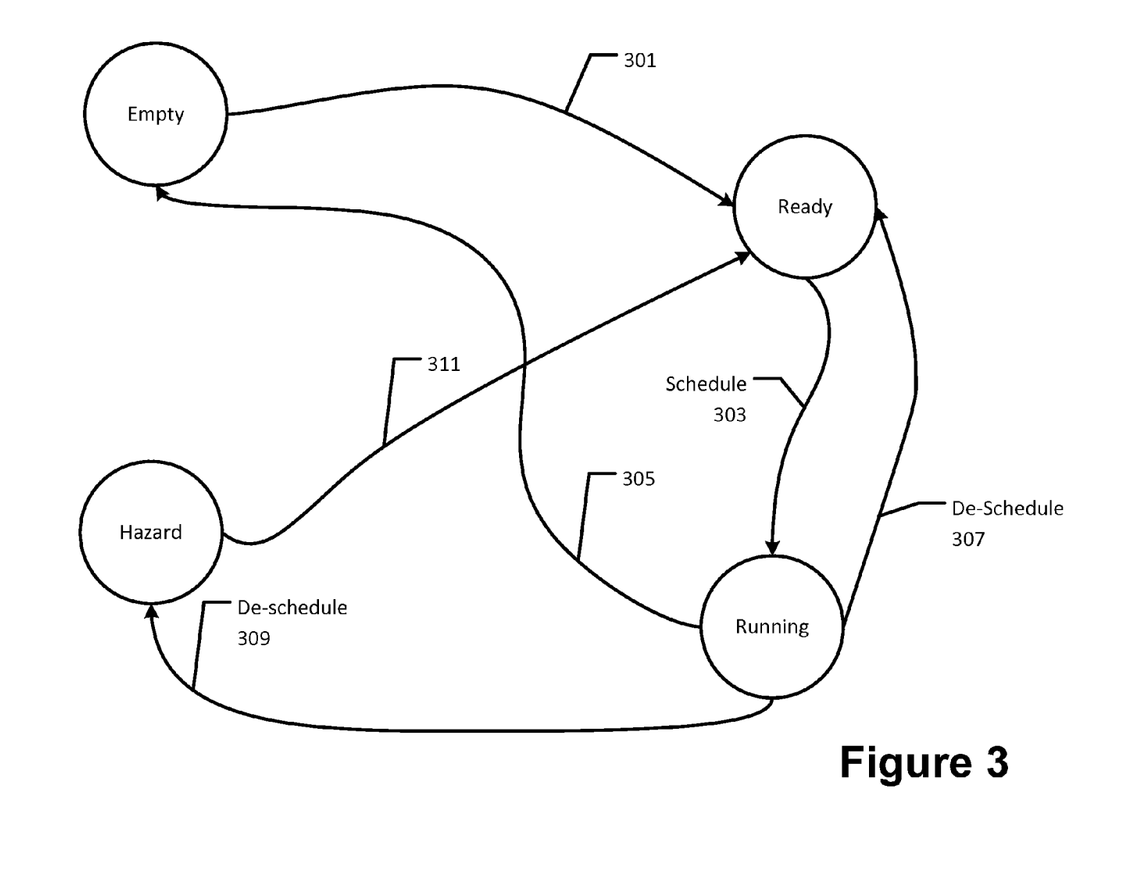
FIG. 3 is a schematic diagram showing transitioning between the four possible states of a thread.

The transitioning between the four states is shown schematically in FIG. 3.

Firstly, let's consider the transition 301 from "empty" to "ready". This happens when a new thread is submitted and it then waits in the resident threads to enter the "running" subset 209.

Now let's consider the transition from "ready" to "running" 303. When a space becomes available in the "running" subset (which may happen when a running thread finishes its final instruction thereby freeing up space in the "running" subset), the thread manager selects one of the "ready" threads and transitions it to the "running" state. This is known as scheduling a thread. The thread manager may use an algorithm to select the ready thread for transition from the resident ready threads, for example it may use a simple round-robin approach.

Now let's consider the transition 305 from "running" to "empty". The instruction decoder can tell when it receives the final instruction of a particular thread. When that happens, it tells the thread manager to move the state of that thread from "running" to "empty" by communicating along the interface 119 (see FIG. 1) with a command that includes the thread ID 201 and a command to make the thread "empty". This will then free up space in the "running" subset so that another ready resident thread can be transitioned to "running" 303.

Finally, let's consider the transition 307 from running back to "ready". This might happen if the processor supports a timer such that the number of clock ticks that any given thread could remain running was limited. Then, if a thread exceeded this threshold, it would transition back to the "ready" state from the "running" state. This could be achieved via a command from the instruction decoder to the thread manager via the interface 119 in FIG. 1, the command including the thread ID 201 and a command to make the thread "ready". This type of mid-thread transition is known as de-scheduling a thread. Because the thread has not been completed, it transitions to "ready" rather than "empty" and the thread will need to be scheduled again at a later point in order to complete. The act of de-scheduling a thread will cause the thread manager to run an algorithm to choose one of the "ready" threads to schedule, because a space will be available in the "running" subset.

Transitions 309 and 311 to and from the hazard state will be described below.

Note that the thread manager can transition thread states in a single clock tick since they are resident.

The description above relates to short latency instructions only, when data hazards can be avoided relatively easily by selecting the number of threads permitted to be in the "running" subset. The processing of long latency instructions will now be described.

To absorb the latency of long latency instructions two features are used: hazard counters and the hazard state.

Referring to FIG. 2, column 207 stores the hazard counter values for each thread. In this example there are three hazard counters and they can each take any value from 0 to 7. However, the number of hazard counters may be different and/or the number of values each hazard counter can take may also be different. The hazard counter values are actually stored in the instruction decoder but the thread manager has access to the hazard counter values.

The instruction decoder can tell whether the instruction it has just received is a short latency instruction or a long latency instruction. If the instruction is a long latency instruction, the instruction decoder automatically increments one of the hazard counters (more on which one later) by one. Then, it sends the instruction for execution as it would for any short latency instruction. The nominated hazard counter, as well as the thread ID are passed down the processor pipeline for these long latency instructions so that, when the data is finally written to the destination register, the hazard counter and the thread ID are present on the interface.

As the data is being written to the register store 111, the instruction decoder looks at the hazard counter and thread ID (see 121 in FIG. 1) and decrements the hazard counter for the particular thread so that the loop is closed.

Figure 4:
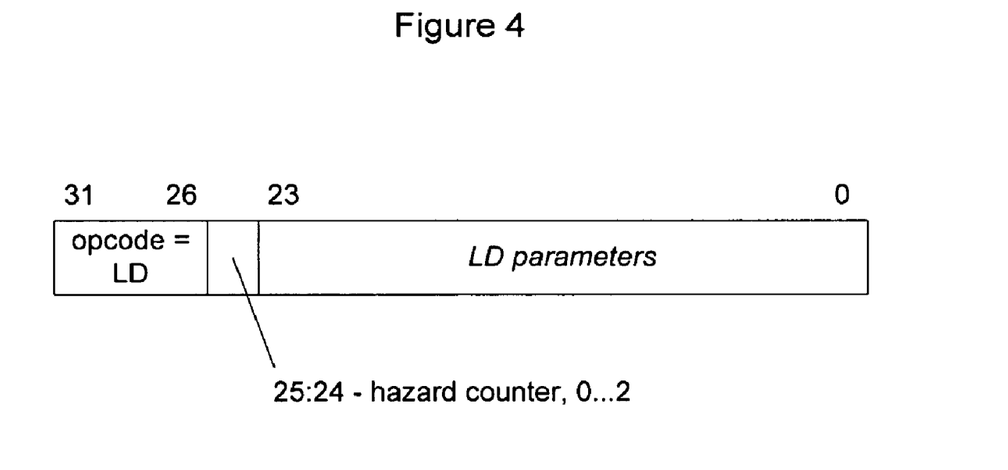
FIG. 4 is a schematic diagram of a 32-bit long latency memory load instruction.

An example of such a long latency instruction is shown in FIG. 4. The instruction shown in FIG. 4 is a 32 bit memory load instruction and it comprises 24 bits of payload, 6 bits of operation instruction and 2 bits indicating the hazard counter to be incremented.

So, as long latency instructions are fed into the instruction decoder, the instruction decoder increments an appropriate hazard counter. When the long latency instructions are completed, the instruction decoder decrements the hazard counter. Thus, the hazard counter of any thread will depend on how many of its long latency instructions are currently running. Thus, if there are no outstanding destination register writes, the hazard counter will be zero, but if there are any outstanding destination register writes, the hazard counter will be non-zero. Thus, referring to FIG. 2, we know that thread ID 11 has two writes currently outstanding, since its first hazard counter value is 2.

The number of long latency instructions that can be running at any one time, depends on the number of hazard counters and the maximum value that those hazard counters can each take. In this case, 21 (3×7) long latency instructions can be running for a particular thread. If a further long latency instruction were to enter the instruction decoder, the processor would stall until one of the currently running long latency instructions had been completed, thus decreasing the hazard counter, at which time, the processor could restart.

In the preferred embodiment, a WHC (Wait for Hazard Counters) instruction precedes an instruction which depends upon an earlier instruction being completed before it can be implemented correctly (i.e. if it were processed first there might be a data hazard). (An alternative approach would be to include WHC bits in the instruction itself and this possibility is discussed further below.) When the instruction decoder receives a WHC instruction, it knows it must check the hazard counters for the thread or threads indicated in the WHC instruction. This is because the WHC instruction precedes an instruction (or instructions) that depends on an earlier instruction having been completed. If there is a non-zero hazard counter for that thread or threads, we know that there are outstanding register writes. When the instruction decoder checks the hazard counters for that thread, if the hazard counters are zero, nothing happens and the instruction decoder will proceed to the next instruction for execution as normal. (The WHC instruction itself just dies in the instruction decoder since it has performed its purpose.) On the other hand, if the hazard counters are non-zero, the instruction decoder tells the thread manager to transition the thread into the "hazard" state (transition 309 in FIG. 3) via the interface 119 (FIG. 1).

The WHC instruction does not need to immediately precede the instruction which depends on an earlier instruction being completed before it can be implemented correctly. As long as the WHC instruction is somewhere between the long latency instruction and the instruction which depends on completion of that long latency instruction, the WHC instruction will achieve its purpose. Also a single WHC instruction can "enable" lots of later instructions, for example where a single long latency instruction's result is later used by many instructions. The later instructions will be indicated in the WHC instruction.

When a thread has been moved from the "running" state to the "hazard" state, a space becomes available in the "running" subset 209. Another resident thread which is in the "ready" state can then be scheduled i.e. moved to the "running" state, transition 303, so as to absorb the latency of the thread while it remains in the "hazard" state. The larger the gap between the number of resident threads (in this case 16) and the number of threads permitted in the "running" subset (in this case 4), the more likely it will be that the thread manager finds a thread in the "ready" state which can be scheduled to absorb the latency of the "hazard" thread.

But once the thread is in the hazard state, how does it transition out of the hazard state (i.e. transition 311)? Every clock tick, the thread manager looks at the hazard counters of any threads that are in the hazard state. Remember that the hazard counters will decrease as long latency instructions are being completed. If the hazard counters are still non-zero, the thread manager takes no action and leaves the thread in the "hazard" state. If the hazard counters have, by now, reduced to zero, the thread can be transitioned from the "hazard" state to the "ready" state by the thread manager. This is the transition 311 in FIG. 3. Thus, once the hazard counters have decreased to zero, we know that there are no outstanding destination register writes. Thus there is no chance that the WHC instruction will be processed out of order, thereby causing a data hazard.

In actual fact, the thread manager does not need to look at the hazard counters of the "hazard" threads at each and every clock tick. As long as the thread eventually makes the transition from the "hazard" state to the "ready" state, the checking can be done every few clock ticks. In actual fact, this would be advantageous when working at high frequencies and it could also reduce gate count.

It was discussed earlier that there may be several hazard counters and the instruction decoder nominates one to increment for each long latency instruction. In this example, there are three hazard counters, each of which can take a value from 0 to 7.

Figure 5:
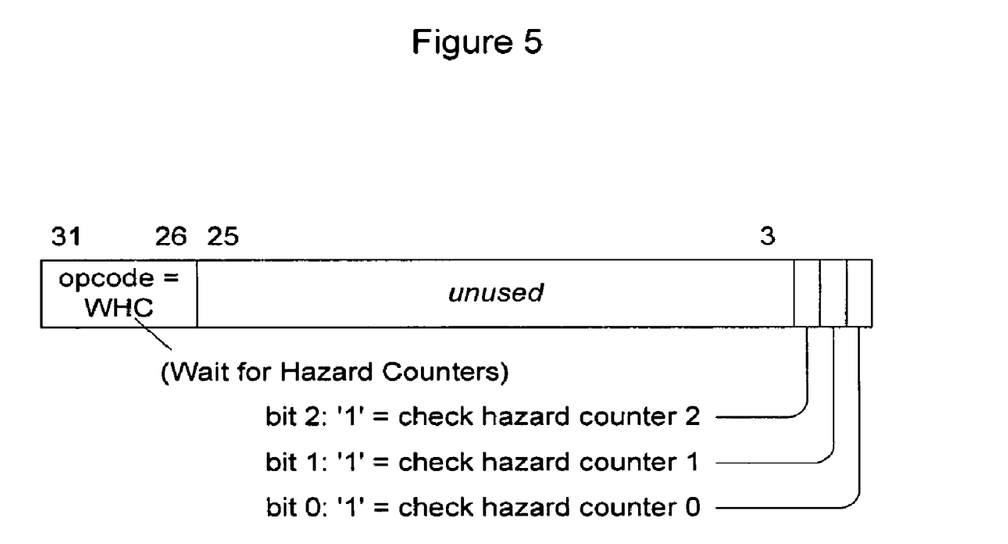
FIG. 5 is a schematic diagram of a 32-bit WHC instruction.

FIG. 5 shows a WHC instruction (i.e. one that precedes an instruction which depends on earlier instructions). The WHC instruction includes three bits, each of which correspond to a hazard counter. If any of the bits are non-zero, this is an indication that the corresponding hazard counter should be checked before the next instruction is implemented. The compiler should choose which hazard counter to assign to each long latency instruction in a manner that optimises the performance of the latency absorption.

The compiler which produces the instructions executed by the processor, should be optimised to place the WHC instruction immediately before the instruction which uses the result of the long latency instruction. Thus, the WHC indication is received before the instruction is processed. Also, the compiler should try to position the WHC instructions in the thread, as far as possible from the long-latency instructions which increment the corresponding counters. This will minimise the number of threads in the hazard state. This may be done by the compiler reorganising the order of the instructions.

For example, a WHC instruction might not depend on all long latency instructions having been processed before it is processed, but simply some of the long latency instructions in its thread. In that case, the long latency instructions on which the WHC instruction depends, can be nominated to increment, say, the first hazard counter. On the other hand, long latency instructions on which the WHC instruction does not depend can be nominated to increment, say, the second hazard counter. Then, in the WHC instruction, the bit corresponding to the first hazard counter will be non-zero, whereas the bit(s) corresponding to the other hazard counter(s) will be zero. Then, the instruction decoder knows that the only hazard counter that needs to be checked is the first hazard counter, since the other hazard counters are not relevant to this particular WHC instruction. Referring to FIG. 4, we see that the hazard counters to increment are indicated at bit numbers 25 and 26.

Consider the example of an instruction stream below, which is a good usage of the hazard counters. Note that "Load" instructions are long latency instructions in the following examples and "Add" instructions are short latency instructions.

1) Load register location (r) 0 and increment hazard counter (HC) 0;
2) Load r 1 and increment HC 0;
3) Load r 2 and increment HC 1;
4) Load r 3 and increment HC 1;
5) Load r 4 and increment HC 2;
6) Load r 5 and increment HC 2;
7) Wait for HC 0 to decrease to value 0;
8) Add r 0 and r 1 and put in r 9;
9) Wait for HC 1 to decrease to value 0;
10) Add r 2 and r 3 and put in r 10;
11) Wait for HC 2 to decrease to value 0;
12) Add r 4 and r 5 and put in r 11;

Contrast this with the following instruction stream, which does not make good usage of the hazard counters:
1) Load r 0 and increment HC 0;
2) Load r 1 and increment HC 0;
3) Load r 2 and increment HC 1;
4) Load r 3 and increment HC 1;
5) Load r 4 and increment HC 2;
6) Load r 5 and increment HC 2;
7) Wait for HC 0, HC 1 and HC 2 to decrease to value 0;
8) Add r 0 and r 1 and put in r 9;
9) Add r 2 and r 3 and put in r 10;
10) Add r 4 and r 5 and put in r 11.

In the second example, all three hazard counters must reduce to zero before any of the subsequent instructions can be implemented. But, this is not particularly efficient since the instruction to put the sum of r 0 and r 1 into r 9, for example, only depends on r 0 and r 1 and not on the other register locations. So, the thread will be in the "hazard" state for longer. The first example makes much better use of the hazard counters. By dividing up the long latency instructions across the available hazard counters, instructions can start earlier thereby providing a running thread to absorb hazards on other threads. The compiler knows the difference between long latency instructions and short latency instructions and also knows which instructions depend on which earlier instructions, so can make efficient use of the hazard counters.

In the FIG. 4 example, the hazard counters are nominated in the long-latency instruction. However, this does not need to be the case and an alternative method would be to tie the hazard counter number to the least significant bits of the destination register address. So, for example, any loads into register location 0 will increment hazard counter 0, but any loads into register location 5 will increment hazard counter 1. This conserves valuable instruction encoding space, but makes it difficult to implement complex addressing modes such as indexing, where the actual destination register address is not known by the compiler or the instruction decoder.

In this example, the WHC instructions supports checking of more than one hazard counter at a time. That is, in the example of FIG. 5, the WHC supports checking of three hazard counters since there are three WHC bits in the WHC instruction. However, this does not necessarily need to be the case and it could be that each WHC instruction simply nominates a single hazard counter which should be checked. In that case a first WHC instruction could nominate HC1 to check and a second WHC instruction could nominate HC2 to check, and so on. This would save on a small number of gates.

A number of general points should be noted regarding the above embodiment.

The described embodiment includes 16 resident threads, of which up to 4 are in the "running" subset at any one time. But the system also scales to very high clock frequencies. As the clock frequency increases, the latency, in terms of clock ticks, of both short latency and long latency instructions increases. This means that the number of threads in the "running" subset can be increased to satisfy the new, higher latency of short latency instructions. And, the number of resident threads can also be increased to compensate.

Other points about the described embodiments are as follows:

Before a thread can terminate, the hazard counters must all be zero. (This is fairly clear because a non-zero hazard counter means that there is an outstanding instruction.)

The instruction decoder stores the hazard counters for all the threads. The hazard counters can be non-zero when the thread is in the hazard state. As soon as the hazard counters are zero, at the next check, the thread manager will transition them to the ready state.

In some cases, the hazard counters can be non-zero in the running state. This occurs when a long latency instruction is executed (which increments the hazard counter) but before a WHC instruction has arrived. Or, even when a WHC instruction has arrived, it may not correspond to that hazard counter, so the thread will remain in the running state.

The example described above with reference to FIGS. 1 to 5 shows hardware for performing the method. The method of the invention could of course alternatively be implemented in software.

An alternative, efficient use of the hazard counters is as follows. In SIMD processors, one long-latency instruction might kick start several register writes via an external unit. A problem might be encountered with this because the instruction decoder might only increment the hazard counter by 1 at the outset but might try to decrement the hazard counter several times at the end, once for each register write. We can cope with this by passing a flag around the pipeline which indicates just the final register write for the instruction. When the instruction decoder sees this flag, it will know to decrement the hazard counter. So, each long latency instruction only increments the hazard counter by one, even if there are multiple register writes. It is possible that the hazard counters could be used in a different way. For example, the hazard counter could be incremented at the outset, once for each register write rather than once for the entire long latency instruction. Then, no flag would be needed because the instruction decoder would just decrement the hazard counter by one, once each register write is completed. This way of using hazard counters is equally valid but does mean that the hazard counters are used up more quickly, increasing the likelihood of a stall for fewer long latency instructions in the pipeline.

In addition, it is possible to use the WHC instructions in a slightly different way. The functionality of the WHC instruction could be integrated into all the "regular" instructions thereby eliminating it as an additional instruction. In this case, there are bits in the instruction encoding which tell the instruction decoder which hazard counters, if any, to wait for. These bits do not need to be on every instruction, but for those which do not have them, they cannot be configured to wait for data to return from long-latency instructions. The benefit is a reduction in the size of programs and instruction bandwidth but at the cost of instruction encoding bits.

In the introduction, a number of requirements were set out which the invention had to meet while solving the problems.

Firstly, in a multi-threaded processor, many threads might have potential data hazards. This is satisfied in the described embodiment, since, of the 16 resident threads, up to 12 can be in the hazard state while 4 are still running. In different embodiments (with a different number of threads permitted to be resident and a different number permitted to be in the running subset), this would also work.

Secondly, each thread might have a large number of long latency instructions. This is also satisfied here by the number of hazard counters and the range of values that each hazard counter can take. In the described embodiment, the hardware provides three hazard counters, each of which can run from value 0 to value 7. Therefore, each resident thread can guarantee that 21 long latency instructions can be outstanding and undergoing processing, before the processor stalls. If we knew that the number of long latency instructions was particularly high, we could increase the number of hazard counters or the range of values that each could take or, if we thought it sufficient, the number of hazard counters could be decreased. In a preferred embodiment used in practice, only two hazard counters are used, each taking a value between 0 and 15.

It also must be possible for the return data from long latency instructions to come back in a different order from which they were dispatched. This is satisfied by the following instruction stream which may be executed:

1) Load r 0 and increment HC 0 (long latency Load instruction);
2) Sample r 1 and increment HC 0 (this is a long latency sampling instruction);
3) Wait for HC 0 to decrease to value 0;
4) Add r 0 and r 4 and put in r 2 (short latency Add instruction);
5) Add r 1 and r 5 and put in r 3.

In this example, which would work with this invention, r 1 can be written by the texture sampling unit before r 0 is written to by the memory interface. Both of the instructions only decrement HC 0 so the order is not important.

We also must reduce, as much as possible, processor stalling due to data hazards from long latency instructions. The largest gains are expected to be due to threads getting descheduled on WHC instructions because fresh threads will be scheduled, which hopefully will run for quite some time before they encounter any WHC instructions themselves. In addition, the WHC instruction does not have to come right after the long latency instruction. It should come immediately before the data is sourced. Useful instructions can be inserted in between the long latency instruction and the WHC which will further absorb latency. By having multiple hazard counters, time spent waiting for data that is not actually required is reduced. For example, consider the following instruction stream in a system with only two hazard counters, HC 0 and HC 1:

1) Load r 0 and increment HC 0 (long latency Load instruction);
2) Load r 1 and increment HC 0;
3) Load r 2 and increment HC 1;
4) Wait for HC 0 to decrease to value 0 (i.e. wait for r 0 and r 1);
5) Add r 0 and r 10 and put in r 3 (short latency Add instruction);
6) Add r 3 and r 11 and put in r4;
7) Add r 4 and r 12 and put in r 5;
8) Add r 5 and r 1 and put in r 6 (first time r 1 is used);
9) Add r 6 and r 13 and put back in r 6;
10) Add r 6 and r 14 and put back in r 6;
11) Add r 6 and r 15 and put back in r 6;
12) Wait for HC 1 to decrease to value 0;
13) Add r 2 and r 6 and put back in r 6.

In this example the latency absorption of a system with two counters is worse than one with three counters.

It has to be possible to skip over any instructions in the thread so as to support flow control such as branches. This is satisfied here since every long latency instruction increments the hazard counter when it is decoded and decrements the hazard counter when it is written to the destination register. Regardless of whether there is a WHC instruction or not, this incrementing and decrementing always happens and the coherency of the hazard counters is always maintained. A thread cannot terminate until all the hazard counters for the thread are zero.

It must also be possible to read results in a different order than they were written. The following example illustrates this point:

1) Load r 0 and increment HC 0;
2) Load r 1 and increment HC 0;
3) Wait for HC 0 to decrease to value 0;
4) Add r 1 and r 4 and put in r 2;
5) Add r 0 and r 5 and put in r 3.

In this example, the r 0 load is carried out before the r 1 load but the r 0 add is carried out after the r 1 add.

It also must be possible for there to be multiple read access for destinations. The following example illustrates this point:
1) Load r 0 and increment HC 0;
2) Wait for HC 0 to decrease to value 0;
3) Add r 0 and r 4 and put in r 2;
4) Add r 0 and r 5 and put in r 3.

In this example, r 0 must be read twice for each of instructions 3) and 4).

It also must be permitted for the same destination to be written to and re-used as a destination for another long latency instruction. The following example illustrates this point:
1) Load r 0 and increment HC 0;
2) Wait for HC 0 to decrease to value 0;
3) Add r 0 and r 4 and put in r 2;
4) Load r 0 and increment HC 0;
5) Wait for HC 0 to decrease to value 0;
6) Add r 0 and r 5 and put in r 3;

In this example, r 0 is written to twice.

Finally, it is preferable that no special or extra storage is needed in processing the long latency instructions and potential data hazard instructions. The data returning from the external units does not need to go into special storage, like a FIFO, but it can go straight into the nominated destination register. It is up to the compiler to make sure no instruction writes to the same destination register, otherwise a WHC instruction is required first.

It is also preferable the gate costs are kept to a minimum. The system is scalable, the number of hazard counters can be adjusted and the maximum hazard counter value can also be adjusted. One thing this affects is how many long latency instructions can be dispatched per thread before stalling occurs due to the hazard counters saturating. The amount of storage per resident thread is minimal: just 12 bits per thread for three hazard counters ranging from 0 . . . 7.

The invention claimed is:

1. A multi-threaded processor, comprising:
   a plurality of state machines for tracking a current state of each thread of a plurality of threads, each state machine having states comprising hazard, running, and ready;
   a respective plurality of hazard counters assigned to each thread currently in the running state;
   an instruction decoder operable to
   decode a sequence of instructions from. a thread of the plurality of threads that is in the running state,
   identify each long latency instruction in the sequence of instructions and responsively increment a selected hazard counter of the plurality of hazard counters assigned to that thread, associate the selected hazard counter with the long latency instruction, and dispatch the long latency instruction for execution,
   responsive to completion of any previously dispatched long latency instruction, decrementing the hazard counter associated with that long latency instruction,
   identify a hazard instruction in the sequence of instructions and determine if a value of a hazard counter of the plurality of hazard counters assigned to that thread indicates one or more outstanding tong latency instructions that pose a hazard for the hazard instruction, responsively changing state of the thread from running to hazard, and selecting a replacement thread from a pool of threads having a ready state and changing the replacement thread state to running; and
   a pipelined execution unit for executing operations according to decoded instruction data from the instruction decoder.

2. The multi-threaded processor of claim 1, wherein one or more hazard instructions are demarcated by a wait for hazard counter instruction provided in the sequence of instructions, before the one or more hazard instructions.

3. The multi-threaded processor of claim 1, wherein a hazard counter of the plurality of hazard counters is associated with each hazard instruction by one or more bits that identify the associated hazard counter.

4. The multi-threaded processor of claim 3, wherein the one or more bits that identify the associated hazard counter are provided with the hazard instruction.

5. The multi-threaded processor of claim 3, wherein the one or more bits that identify the associated hazard counter precede the one or more hazard instructions.

6. The multi-threaded processor of claim 1, wherein both hazard instructions and long latency instructions are respectively associated with one or more bits that identify a respective hazard counter of the plurality of hazard counters.

7. The multi-threaded processor of claim 1, wherein at least three counters are allocated to each running thread.

8. The multi-threaded processor of claim 1, wherein at least three counters are allocated to each running thread, and each counter has at least three bits, allowing representation of decimal numbers 0 through 7.

9. The multi-threaded processor of claim 8, wherein a value of 0 indicates that the hazard is cleared.

10. The multi-threaded processor of claim 1, wherein the multi-threaded processor is operable to periodically evaluate the hazard counter for clearance of the hazard.

11. The multi-threaded processor of claim 1, wherein the multi-threaded processor is operable to determine if a value of a hazard counter of the plurality of hazard counters assigned to that thread indicates that the one or more outstanding long latency instructions have completed, and responsively changing state of the thread from hazard to ready.

12. The multi-threaded processor of claim 1, wherein hazard instructions and long latency instructions are each associated with one or more bits that identify a respective hazard counter of the plurality of hazard counters.

13. A method of multi-threaded computing, comprising:
   decoding and dispatching, for execution, instructions in respective sequences of instructions from threads in a pool of threads in a running state;
   maintaining the pool of threads in the running state by swapping any thread in the pool of running threads into a pool of hazard threads, responsive to reaching a hazard instruction in the sequence of instructions of that thread, and determining that a respective hazard counter associated with that thread indicates an outstanding long latency instruction; and
   updating a hazard counter, responsive to completion of a long latency instruction, the updated hazard counter respectively associated with the thread from which the completed long latency instruction came.

14. The method of multi-threaded computing of claim 13, wherein a plurality of hazard counters are associated with each thread in the running state, and the maintaining of the pool of threads in the running state comprises identifying one of the hazard counters associated with each of the long latency instructions, and incrementing that identified hazard counter responsive to dispatching each long latency instruction for execution.

15. The method of multi-threaded computing of claim 13, wherein a plurality of hazard counters are associated with each thread in the running state, and the maintaining of the pool of threads in the running state comprises identifying one of the hazard counters associated with each of the long latency instructions, and decrementing the identified hazard counter responsive to completing a long latency instruction associated with that counter.

16. The method of multi-threaded computing of claim 13, further comprising reading a sequence of instructions for a thread from a tangible computer readable medium, the sequence of instructions comprising a plurality of long latency instructions and a plurality of hazard instructions dependent on completion of respective one or more of the long latency instructions, and wait for hazard instructions separating each hazard instruction from the long latency instructions on which it depends.

17. The method of multi-threaded computing of claim 13, wherein the hazard counter is one hazard counter of a plurality of hazard counters associated with that thread, and the method further comprises updating one of the hazard counters of the plurality responsive to dispatch and completion of each long latency instruction in that thread.

18. A non-transitory machine readable medium comprising:
   a compiler for producing a sequence of machine readable instructions, the sequence of instructions comprising a plurality of tong latency instructions and a plurality of hazard instructions that depend on completion of different ones of the plurality of the long latency instructions, the compiler operable to
      produce an instruction sequence comprising the plurality of long latency instructions and the plurality of hazard instructions,
      identify a hazard counter of a plurality of hazard counters to be incremented by an instruction decoder for each of the long latency instructions,
      determine a respective insertion point for one or more wait for hazard instructions in the instruction sequence, wherein each wait for hazard instruction identifies a hazard counter of the plurality; wherein
   the compiler targets the instruction sequence to a multi-threaded processor operable to operable to maintain a pool of running threads and a pool of hazard threads, by transitioning a thread from the pool of running threads to the pool of hazard threads in response to decoding one of the wait for hazard instructions that identifies a counter having a value indicating an outstanding long latency instruction.

19. The tangible machine readable medium of claim 18, wherein the compiler is operable to indicate a respective counter in each wait for hazard instruction by setting one or more bits in the data dk.41ning the hazard instruction, and wherein the counters indicated in the inserted wait for hazard instructions are selected by the compiler in conjunction with the placement of long latency instructions in the instruction sequence so that different outstanding long latency instructions are assigned to different hazard counters and hazard instructions are distributed among the wait for hazard instructions in the instruction sequence.

* * * * *